Dec. 23, 1969  O. LANG ET AL  3,485,108
ROTARY DRIVE ARRANGEMENT
Filed April 10, 1968  3 Sheets-Sheet 1
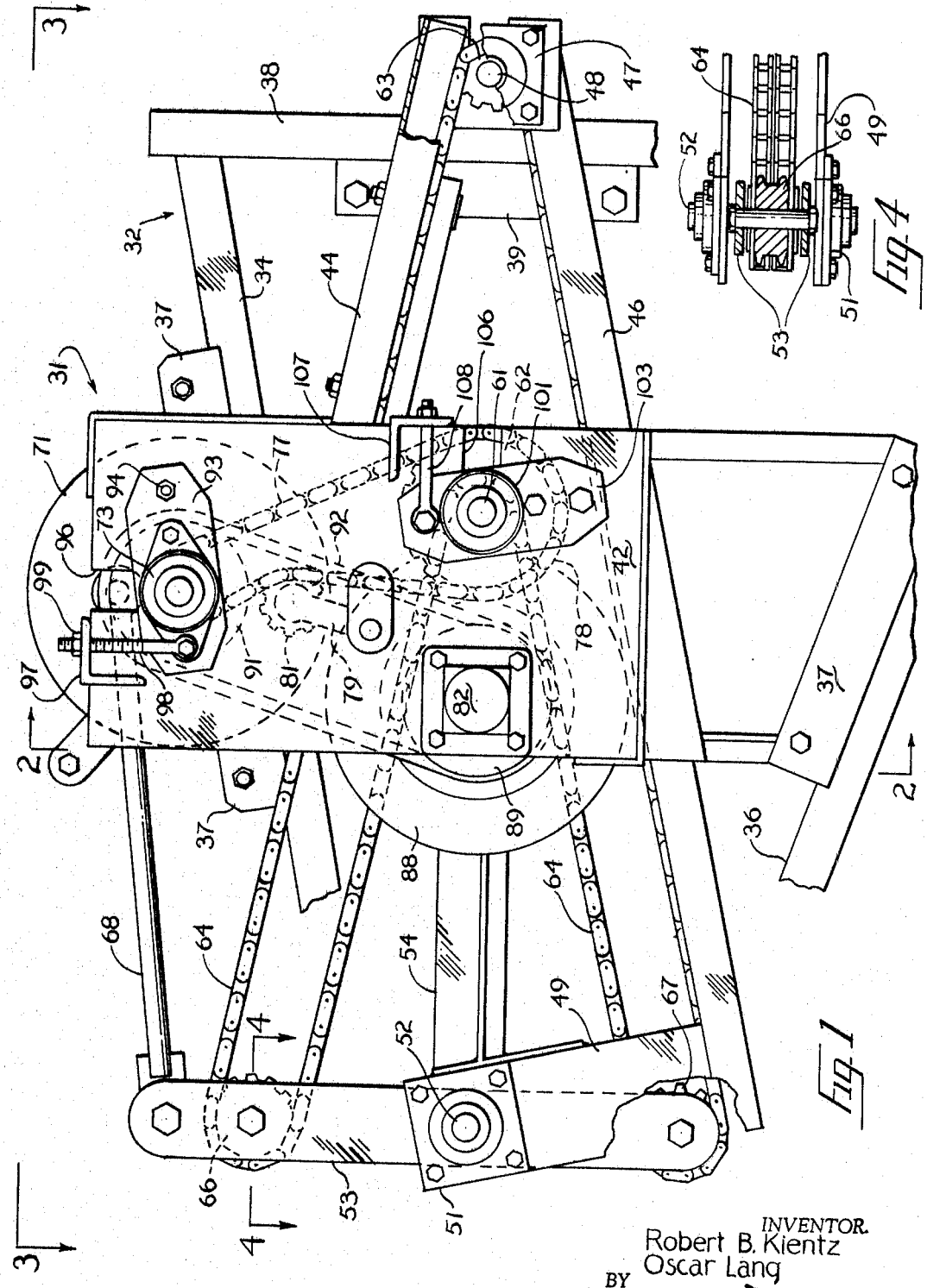
INVENTOR.
Robert B. Kientz
Oscar Lang
BY
Gardner & Zimmerman
Attorneys

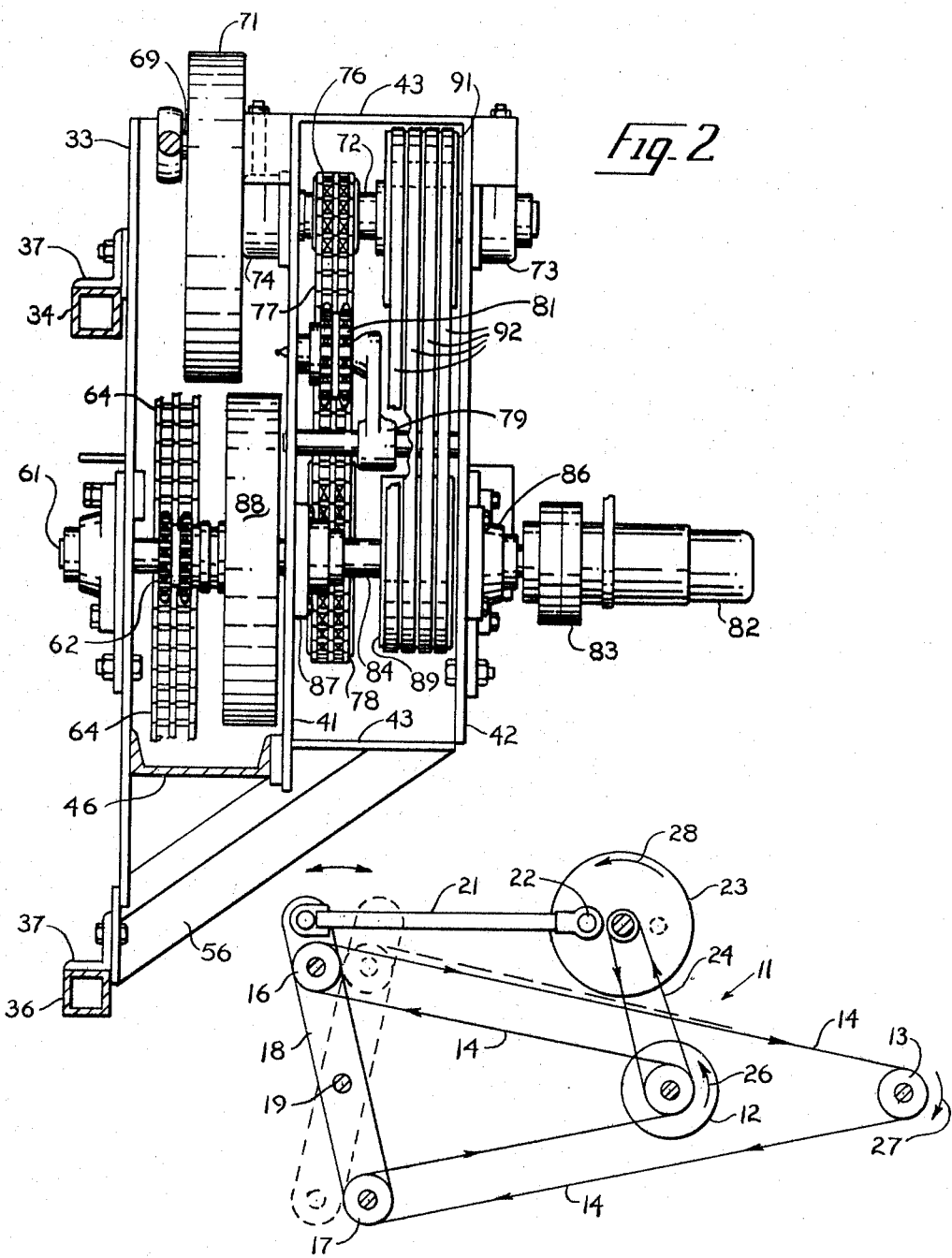

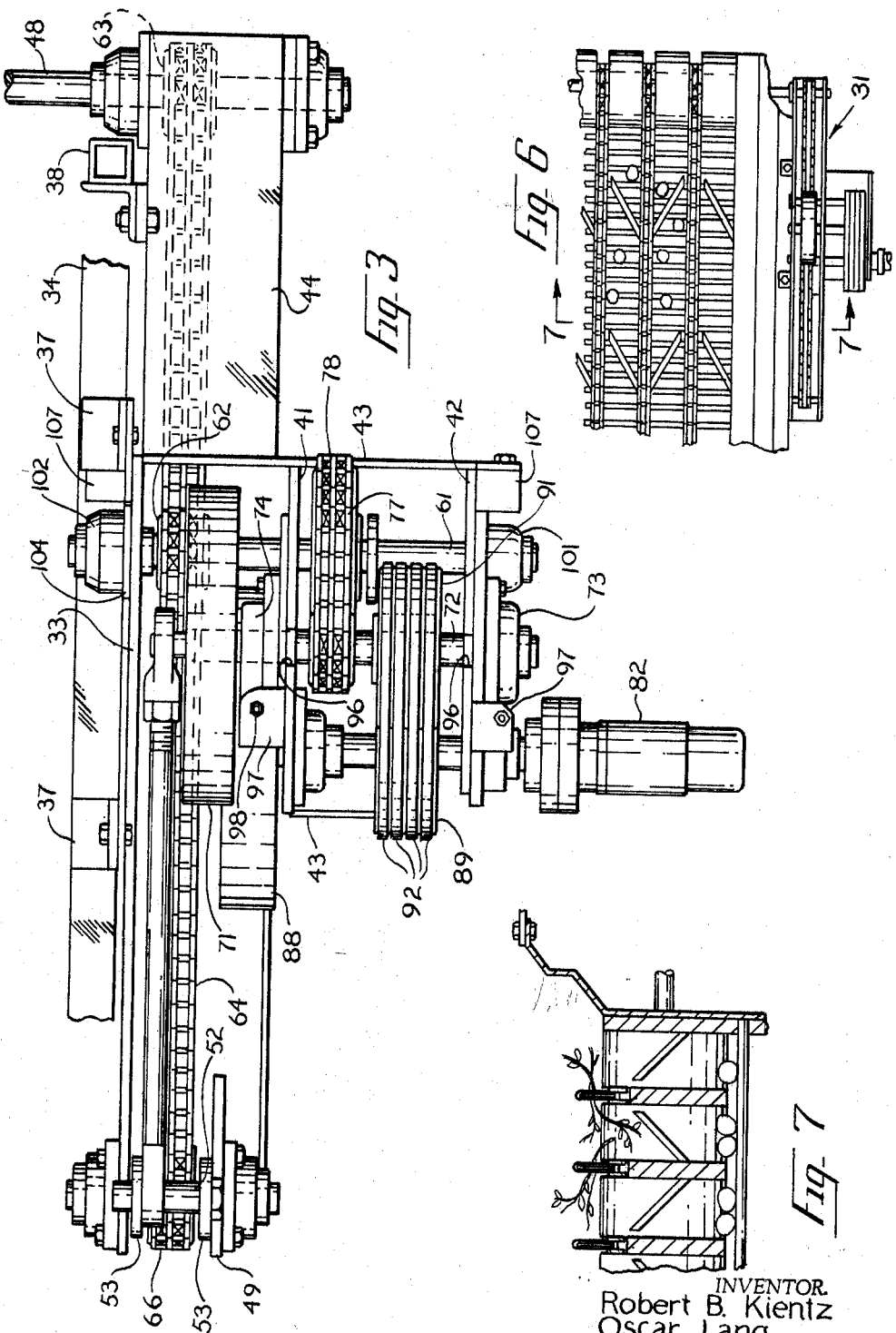

United States Patent Office 3,485,108
Patented Dec. 23, 1969

3,485,108
ROTARY DRIVE ARRANGEMENT
Oscar Lang, San Leandro, and Robert B. Kientz, Oakland, Calif., assignors to Benner-Nawman, Inc., Oakland, Calif., a corporation of California
Filed Apr. 10, 1968, Ser. No. 720,163
Int. Cl. F16h 7/06, 9/24
U.S. Cl. 74—217                                4 Claims

ABSTRACT OF THE DISCLOSURE

A drive arrangement is described for transmitting the rotary motion of a drive sprocket at one velocity to a second or driven sprocket in such a manner that the velocity of rotation of the second sprocket is periodically varied relative to the velocity of the drive sprocket. An endless chain couples the two sprockets together and passes around two idler sprockets. These idler sprockets are so located that they can be moved to alternately shorten and lengthen the distance through which the chain must travel from the drive sprocket to the second sprocket while simultaneously lengthening and shortening respectively the distance the chain must travel from the second sprocket to the first. This changing of the distances through which the chain must travel causes a compound motion to be imparted to the second sprocket which is the result of adding the motion caused by the changing distances to the rotary motion of the driving sprocket.

BACKGROUND OF THE INVENTION

This application relates to a drive arrangement for transmitting the rotary motion of one rotatable member to another, and, more particularly, to such a drive arrangement by which the rotation of a first member at one velocity is transmitted to a second member in such a manner that the velocity of rotation of the second member is periodically varied relative to the velocity of motion of the first member.

For certain applications, it is desirable that a drive arrangement capable of transforming a continuous rotary motion into a periodically varying motion be provided. For example, in certain conveyor systems, such as those mounted on harvesting equipment, it is advantageous that the conveyor move in an uneven fashion so that the objects being conveyed are agitated. In harvesters such as tomato harvesters, this agitation or shaking is used to separate the vegetables from their vines, from other vegetation, and from dirt. The conveyors are usually arranged so that the unwanted matter falls from the conveyor, and the vegetables are carried to the end of the conveyor for subsequent handling. To provide the agitation of the conveyor, it has been the practice in the past to either mount the entire conveyor system on some sort of an agitating mechanism or provide two separate drive mechanisms, one to advance the conveyor and one to agitate the same. Both of these ways of obtaining the agitation require expensive and complex mechanisms. For this reason, more simple conveyor mechanisms have been designed which can simultaneously advance and agitate a conveyor. However, these mechanisms have generally not been acceptable, primarily because they most often cause an up and down agitation of the conveyor belt or chains rather than an intermittent variation in the longitudinal motion of the conveyor.

SUMMARY OF THE INVENTION

The present invention is a drive arrangement by which the rotary motion at one velocity of a first member is transmitted to a second rotatable member in such a manner that the rotation of the second member is intermittently or periodically varied relative to the first member. The drive arrangement can be adapted to provide many different variations of rotation for the second member even though the first member maintains a constant speed. For example, it can be designed to cause the second member to alternately speed up and slow down, stop and go, or even intermittently reverse its direction of motion. It will be appreciated that by having the second rotatable member as a sprocket or wheel driving a conveyor, these different motions can also be transmitted to a conveyor. In its basic aspects, the drive arrangement of the invention includes the two rotatable members, one of which is the driving member. These rotatable members are coupled together by an endless flexible driving member such as a chain or belt. The driving member is longer than is necessary to pass around the two rotatable members and at least two idler members are provided for taking up the slack. These idler members are so located that they can be moved to alternately shorten and lengthen the distance through which the driving member must travel from the first rotatable member to the second while simultaneously lengthening and shortening, respectively, the distance through which the drive member must travel from the second member to the first member. That is, as the distance through which the driving member travels as it moves from the first member to the second member is shortened, the distance the driving member travels from the second member to the first member is lengthened, and vice versa. It has been found that this simultaneous changing of the distances through which the driving member must travel in passing between the rotatable members causes a compound motion to be imparted to the second member. This compound motion is the result of adding the motion caused by the changing distances to the rotary motion of the driving member.

For a conveyor system, the first rotatable member can be a sprocket or wheel driven by a prime mover, and the second rotatable member can be a sprocket or wheel which directly drives the conveyor chain or belt. Thus, a continuous rotation of the first rotatable member by the prime mover can be transformed into periodically varying motion of the conveyor belt. Depending upon the speed by which the distances discussed above are shortened and lengthened, the belt can be alternately speeded up and slowed down, made to stop and proceed, or periodically made to reverse its direction as discussed above.

BRIEF DESCRIPTION OF THE DRAWINGS

With reference to accompanying drawings:
FIGURE 1 is a partly broken away side elevational view of a preferred embodiment of the driving arrangement of the invention;
FIGURE 2 is a cross-sectional view of the drive arrangement of FIGURE 1 taken on planes indicated by the lines 2—2 of FIGURE 1;
FIGURE 3 is a top plan view of the drive arrangement as is indicated by the lines 3—3 of FIGURE 1;
FIGURE 4 is a partial cross-sectional view taken on a plane indicated by the lines 4—4 in FIGURE 1 illustrating the construction of a sprocket and chain of the drive arrangement;
FIGURE 5 is a generally schematic view illustrative of the principle of the invention;
FIGURE 6 is a partial top elevational view of a harvester conveyor having the drive arrangement of the invention in driving relation thereto; and
FIGURE 7 is an enlarged cross-sectional view of the conveyor shown in FIGURE 6 taken on a plane indicated by the lines 7—7 in FIGURE 6.

DETAILED DESCRIPTION OF THE PREFERRED EMBODIMENT

For an understanding of the principle of the invention, reference is made first to FIGURE 5. This figure shows generally schematically a simplified drive arrangement of the invention. It is generally referred to by the reference numeral 11 and includes first and second rotatable members 12 and 13 which may be in the form of chain sprockets or belt pulleys. The rotatable members are coupled together by an endless flexible driving member 14. As shown, driving member 14 is not directly coupled between rotating members 12 and 13, but rather passes over first and second idler members 16 and 17, respectively. Idlers 16 and 17 are mounted spaced from one another on a crank arm 18 which is located at one side of the rotatable members 12 and 13. Arm 18 is mounted for oscillatory motion on a shaft 19 located substantially midway between idlers 16 and 17. The axis of shaft 19 is generally coplanar with the rotational axis of the rotatable members 12 and 13. This results in the idlers 16 and 17 being generally equally spaced from the plane of the axes of the rotatable members.

Oscillation of crank arm 18 is caused by a connecting rod 21 which is eccentrically mounted at 22 on a crank wheel 23. Wheel 23 is suitably coupled to the first rotatable member 12 by a driving member 24 for rotation therewith.

The first rotatable member 12 is adapted to be rotated either directly or indirectly by a suitable prime mover such as an electric motor or internal combustion engine. When it is rotated in the direction of arrow 26, for example, it will cause driving member 14 to travel in the direction of the arrows placed thereon with the result that the second rotatable member 13 will be rotatably driven in the direction of arrow 27. Because the first rotatable member is coupled to crank wheel 23 by endless driving member 24, the crank wheel 23 will be rotated in the direction indicated by arrow 28. This will cause connecting rod 21 to oscillate crank arm 18 about shaft 19. Idler sprockets 16 and 17 will therefore be alternately moved toward and away from the rotatable members. Thus, the distance through which the driving member 14 must travel between the first rotatable member 12 around idler 16 to the second rotatable member 13 is alternately shortened and lengthened as idler 16 goes toward and away from the rotatable members, respectively. By the same token, the distance through which the driving member 14 must travel between the second rotatable member 13 and the first is alternately lengthened and shortened as the idler 17 is moved away from and toward the rotatable members. This changing of the travel distance results in a motion being superimposed upon the driving member 14 and hence upon the second rotatable member 13. For example, with rotatable member 12 rotating at a constant speed, movement of idler 16 toward the rotatable members will cause the driving member to drive the second rotatable member 13 at a speed which is greater than the speed of rotatable member 12. On the other hand, movement of the idler 16 away from the rotatable members will result in the second rotatable member 13 being driven by driving member 14 at a slower rate than that at which the first rotatable member 12 is rotating. Since idler members 16 and 17 are equally spaced from the oscillatory axis of arm 18, they will both be moved equal distances and in opposite directions so that the amount of tension on the driving member 14 remains constant.

It will be appreciated that by varying the speed and distance traveled by the idlers, various motions can be obtained on the second rotatable member. For example, if idler member 16 is moved away from the rotatable members at a greater velocity than the rotation of rotatable member 12, the direction of motion of rotatable member 13 will be reversed. If idler 16 moves away at the same rotational velocity as rotatable member 12, rotatable member 13 will be stopped during such motion.

Reference is now made to FIGURES 1 through 4 for a description of a preferred embodiment of the invention especially adapted for providing intermittently varying motion to a conveyor such one as of the type used in harvesters and the like for separation of vegetables and fruit from their vines and other vegetation. The drive arrangement is generally referred to by the reference numeral 31 and, as best depicted in FIGURE 1, is shown mounted on a side frame structure 32 for a harvester conveyor system. More particularly, a rear support frame plate 33 for the drive arrangement is suitably secured to upper and lower tubular cross members 34 and 36 of a harvester frame such as by means of brackets 37. One end of the drive arrangement is secured to a vertical tubular frame member 38 of the harvester by a bracket 39.

The frame for the drive arrangement itself includes besides rear plate 33 an intermediate support plate 41 and a front support plate 42. Plates 33, 41, and 42 are secured together in spaced parallel relationship by suitable transversely extending braces and plates 43. Upper and lower channel member supports 44 and 46 are secured between rear and intermediate plates 33 and 41, and extend angularly outward therefrom toward one another to provide support for a bearing assembly 47. As will be discussed more fully below, bearing assembly 47 supports a drive shaft 48 for driving the conveyor system. Lower channel member 46 extends beyond plates 33 and 41 on the side thereof opposite of bearing assembly 47 and terminates in an upwardly extending bearing support bracket 49. As best seen in FIGURE 1, bracket 49 has at its upper end bearing assemblies 51 which support a transversely extending axle 52. A crank arm 53 is mounted on axle 52 for oscillatory motion as will be more fully explained below, and a brace rod 54 extends to bracket 49 adjacent bearing assemblies 51 from between rear plate 33 and intermediate plate 41 to maintain rigid support of the axle. To complete the frame structure for the drive arrangement, angular extending brace plates 56 extend between the rear support plate 33 and the intermediate and front support plates 41 and 42 for rigid support of the latter.

Considering now the drive arrangement, a drive shaft 61 extends between the front and rear support plates 42 and 33. Shaft 61 has mounted thereon between intermediate and rear support plates 41 and 33, a double chain sprocket 62. Sprocket 62 is the driving member of this embodiment and corresponds to the first rotatable member 12 in the schematic showing of FIGURE 5. A second double chain sprocket 63 is mounted upon the previously mentioned shaft 48 supported by the bearing assemblies 47 at the junction of channel frame members 44 and 46. Double sprocket 63 is the rotatable member which is driven by sprocket 62 and corresponds to the rotatable member 13 in the schematic arrangement of FIGURE 5. Sprockets 62 and 63 are coupled together by two endless flexible chains 64, which, as shown, pass around upper and lower double idler sprockets 66 and 67. In accordance with the invention, idler sprockets 66 and 67 are so located relative to the sprockets 62 and 63 that by moving them, the distances through which the chain must travel from sprocket 62 to sprocket 63 and from sprocket 63 to sprocket 62 will be simultaneously varied. More particularly, sprockets 66 and 67 are mounted on crank-arm 53 at equally spaced positions on opposite sides of axle 52. It will be noted that axle 52 is coplanar with shafts 48 and 61, and spaced to one side thereof.

Adjacent its upper end, crank arm 53 is pivotally secured to one end of a connecting rod 68. The other end of rod 68 is rotatably mounted on a pin 69 which extends outward from a crank fly wheel 71 at an off-axis or eccentric position. Crank wheel 71 is located between rear and intermediate support plates 43 and 41 and is mounted on one end of an axle or counter shaft 72 which is supported for rotation by bearing assemblies 73 mounted on front and intermediate support plates 42 and 41, respectively.

Crank fly wheel 71 and drive sprocket 62 are coupled together for rotation. More particularly, a double sprocket 76 mounted on counter shaft 72 adjacent the front side of intermediate plate 41 is coupled by two chains 77 to a double sprocket 78 mounted on drive shaft 61. A tension chain tightener arrangement 79 having a double sprocket 81 thereof urged into engagement with the two chains 77 is mounted between plates 41 and 42 to assure proper contact of the chains with the counter and drive shaft sprockets.

Motive power is supplied to counter shaft 72 and, hence, to drive shaft 61 and drive sprocket 62. More particularly, a suitable prime mover such as a hydraulic orbit motor 82 is coupled as by means of a tapered lock coupling 83 to a motor driven shaft 84 which is mounted for rotation within bearing assemblies 86 and 87 transversely of front and intermediate support plates 42 and 41. As best shown in FIGURE 2, a motor driven shaft 84 extends beyond intermediate plate 41 and has a fly wheel 88 secured to its free end. A four belt sheave 89 is mounted on driven shaft 84 for rotation therewith adjacent the inner surface of front support plate 42. A second four belt sheave 91 is mounted on counter shaft 72 in alignment with sheave 89, and four belts 92 couple the two sheaves together. The resulting sheave and belt arrangement will transmit rotary motion of shaft 84 to counter shaft 72 and, hence, through chain 77 and sprockets 76 and 78 to drive shaft 61. However, such arrangement allows slippage between motor driven shaft 84 and the counter shaft so that if there should be any jamming of the conveyor or other apparatus driven by the drive arrangement, damage to the drive arrangement will be prevented.

Means are provided to permit adjustment of the tightness of the belts 92. More particularly, each of the bearing assemblies 73 and 74 supporting counter shaft 72 is mounted on a bearing plate 93 which is pivotally secured to its associated support plate such as by means of a bolt 94 (FIGURE 1), and the counter shaft 72 is supported by the bearing assemblies within slots 96 extending downwardly from the upper edges of the bearing plates. An adjusting mechanism is secured to each of the bearing plates 93 to permit adjustment of the location of the counter shaft 72 within the slot 96, and, hence, adjustment of the tightness of belts 92. This adjustment mechanism for each of the bearing assemblies 73 and 74 includes an angle iron bracket 97 projecting outwardly from its associated plate and through which passes an adjustment bolt 98 which is pivotally secured to the bearing plate 93. The free end of adjustment bolt 98 is provided with an adjustment nut 99, and it will be appreciated that by rotating nut 99 relative to the bolt, bearing plate 93 will be pivoted about its pivotal axis at bolt 94 to adjust the location of counter shaft 72 within the slot 96.

A similar adjusting mechanism is provided for the drive shaft 61. That is, the bearing assemblies 101 and 102 supporting the same are similarly mounted, respectively, upon bearing plates 103 and 104, and drive shaft 61 is located within slots 106 extending inwardly from the side edges of the three support plates 33, 41 and 42. An adjusting mechanism including an angle iron bracket 107 and adjusting bolt 108 are provided on each of the outer supports adjacent the bearing assemblies to permit adjustment of the location of counter shaft 61 within the slots.

It will be appreciated that adjustment of the location of counter shaft 61 will adjust the tightness on the driving chains 64. The provision of the chain tightening arrangement 79 for the chain 77 allows chain 77 to be sufficiently long to permit relative movement between shafts 61 and 72 without adversely affecting the tightness of chain 77.

In operation, fluid is delivered to hydraulic motor 82 to rotate motor driven shaft 84 at the desired speed. The rotation of shaft 84 will be transmitted to counter shaft 72 because of the coupling of these two shafts by the sheaves 89 and 91 and the belts 92. The rotation of counter shaft 72 will in turn be transmitted to drive shaft 61 by means of the two chains 77 coupling double sprocket 76 on counter shaft 72 to double sprocket 78 on drive shaft 61.

It will be appreciated that the velocity and direction of rotation of shaft 61 as described above will be directly related to the velocity and direction of rotation of motor driven shaft 84. That is, if shaft 84 is rotated at a constant speed in one direction, drive shaft 64 also will be rotated at a constant speed in one direction. However, in accordance with the invention, the motion transmitted from drive shaft 61 to driven shaft 48 periodically varies. More particularly, as drive sprocket 62 drives the chains 64, the distance through which the chains 64 must travel between sprockets 62 and 63 is alternately shortened and lengthened and the distance the chain 64 must travel between sprocket 63 and drive sprocket 62 is simultaneously lengthened and shortened, respectively. That is, crank fly wheel 71 and connecting rod 68 cause crank arm 53 to oscillate on shaft 52 simultaneously with the rotation of drive sprocket 62. The result is that idler sprocket 66 is moved toward and away from sprockets 62 and 63, and idler sprocket 67 is simultaneously moved away from and towards such sprockets an equal distance. The resulting movement of the chain 64 superimposes an additional motion on the rotation of sprocket 63 caused by the rotation of sprocket 62.

As has been brought out before, sprocket 63 may be made to alternately slow down and speed up, stop and go, or reverse its direction. For example, if drive sprocket is rotated in the direction of arrow 112 at a constant rotational velocity, driven sprocket 63 can be made to alternately stop and then rotate at double the speed of the drive sprocket if idler sprocket 63 is alternately moved away from and toward drive sprocket 61 at the same linear velocity as a point on the circumference of such drive sprocket. If the idler sprocket moves at a slower velocity, the driven sprocket will be alternately slowed down and speeded up, and if the idler sprocket 66 moves at a greater velocity, the driven sprocket will be made to alternately reverse its direction.

As mentioned before, the drive arrangement of the invention is especially useful in the driving of a harvester conveyor system to separate fruit or vegetables from their vines and other vegetation. FIGURE 6 shows the drive arrangement 31 mounted on the side frame of such a conveyor, and FIGURE 7 is a cross-sectional view of the conveyor illustrating the separation of the fruit from its vines and other vegetation. In such an arrangement, it s desirable that the operator be able to control the speed of orbit motor 82 and, hence, of the conveyor system so that the conveyor has the ability of handling different types of vegetables and fruit. It is also desirable in such an arrangement that the conveyor actually reverse its direction to assure a shaking action on the fruit. However, the net forward motion of the conveyor should approximately equal the ground speed of the machine so that optimum shaking can be obtained without a build-up of material on the conveyor.

We claim:

1. A drive arrangement of the character described comprising a first rotatable member having a fixed axis, a second rotatable member having a fixed axis in spaced relation to the axis of said first member and adapted to be driven thereby, a crank arm having a pair of idler sprockets adjacent the ends thereof and mounted for oscillatory motion about an axis located intermediate said idler sprockets, an endless flexible driving member coupled with said first member, thence with one of said idler sprockets, thence with said second member, and thence with the other of said idler sprockets and back to said first member, a crank wheel coupled with said first member, and a connecting rod eccentrically mounted on said crank wheel and connected to said crank arm.

2. A drive arrangement as set forth in claim 1 including a power input shaft having a weighted fly wheel operatively connected to said crank wheel, said crank wheel likewise comprising a weighted fly wheel and operable to rotate said first member.

3. A drive arrangement as set forth in claim 1 in which means are provided for rotating said crank wheel, said crank wheel being coupled to said first member by a second endless flexible member for rotating the latter.

4. A drive arrangement as set forth in claim 1 in which the oscillatory axis of said crank arm is generally coplanar with the rotational axis of each of said members.

References Cited

UNITED STATES PATENTS

| | | | |
|---|---|---|---|
| 1,801,043 | 4/1931 | Harber et al. | |
| 2,352,797 | 7/1944 | Miller | 74—217 |
| 3,166,947 | 1/1965 | Hendershot | 74—216.5 |

FRED C. MATTERN, JR., Primary Examiner

J. A. WONG, Assistant Examiner